United States Patent
Suzuki

(10) Patent No.: US 12,544,030 B2
(45) Date of Patent: Feb. 10, 2026

(54) RADIATION IMAGING SYSTEM, RADIATION IMAGING APPARATUS COMPRISING DETECTION UNIT, AUTOMATIC EXPOSURE CONTROL UNIT, AND MEMORY CONTROL UNIT, AND CONTROL METHOD FOR RADIATION IMAGING APPARATUS

(71) Applicant: CANON KABUSHIKI KAISHA, Tokyo (JP)

(72) Inventor: Tomoya Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 18/297,543

(22) Filed: Apr. 7, 2023

(65) Prior Publication Data

US 2023/0341567 A1 Oct. 26, 2023

(30) Foreign Application Priority Data

Apr. 20, 2022 (JP) ................ 2022-069550

(51) Int. Cl.
*A61B 6/00* (2024.01)
*A61B 6/42* (2024.01)
(Continued)

(52) U.S. Cl.
CPC ............ *A61B 6/542* (2013.01); *A61B 6/4233* (2013.01); *A61B 6/4283* (2013.01);
(Continued)

(58) Field of Classification Search
CPC ....... A61B 6/42; A61B 6/4208; A61B 6/4233; A61B 6/4266; A61B 6/4283; A61B 6/4452; A61B 6/486; A61B 6/487; A61B 6/488; A61B 6/54; A61B 6/542; A61B 6/545; G01T 1/20; G01T 1/2006; G01T 1/2018;
(Continued)

(56) References Cited

U.S. PATENT DOCUMENTS 6,404,851 B1 * 6/2002 Possin .................. A61B 6/4233
378/98.8
6,797,960 B1 * 9/2004 Spartiotis ................ G01T 1/247
250/370.01
(Continued)

FOREIGN PATENT DOCUMENTS

JP 2014241596 A 12/2014

OTHER PUBLICATIONS

US 11,045,160 B2, 06/2021, Watanabe (withdrawn)*

*Primary Examiner* — Allen C. Ho
(74) *Attorney, Agent, or Firm* — Canon U.S.A., Inc. IP Division

(57) ABSTRACT

A radiation imaging apparatus includes a detection unit that detects radiation applied by a radiation generating apparatus, an automatic exposure control unit that determines whether to stop application of radiation based on an accumulated dose of the detected radiation and to notify the radiation generating apparatus of an instruction to stop the application of radiation in a case where it is determined to stop the application of radiation, a plurality of memories, and a memory control unit that stores, in a first memory from among the plurality of memories, data to be used when the automatic exposure control unit makes the determination.

16 Claims, 6 Drawing Sheets

(51) Int. Cl.
  *G01T 1/02* (2006.01)
  *G01T 1/20* (2006.01)
  *G01T 1/24* (2006.01)
  *H05G 1/28* (2006.01)
  *H05G 1/34* (2006.01)
  *H05G 1/38* (2006.01)
  *H05G 1/40* (2006.01)
  *H05G 1/42* (2006.01)
  *H05G 1/44* (2006.01)

(52) U.S. Cl.
  CPC ............ *A61B 6/4452* (2013.01); *A61B 6/487* (2013.01); *A61B 6/54* (2013.01); *A61B 6/545* (2013.01); *G01T 1/026* (2013.01); *G01T 1/2018* (2013.01); *G01T 1/20184* (2020.05); *G01T 1/245* (2013.01); *H05G 1/28* (2013.01); *H05G 1/34* (2013.01); *H05G 1/38* (2013.01); *H05G 1/40* (2013.01); *H05G 1/42* (2013.01); *H05G 1/44* (2013.01)

(58) Field of Classification Search
  CPC ............ G01T 1/20184; G01T 1/20186; G01T 1/20187; H05G 1/26; H05G 1/265; H05G 1/28; H05G 1/30; H05G 1/32; H05G 1/34; H05G 1/38; H05G 1/40; H05G 1/42; H05G 1/44; H05G 1/56
  USPC ........ 378/98.8, 108–112, 19, 62; 250/370.09
  See application file for complete search history.

(56) References Cited

U.S. PATENT DOCUMENTS

| | | | | |
|---|---|---|---|---|
| 7,079,189 | B2 * | 7/2006 | Tsujii | G01T 1/2928 378/112 |
| 7,382,859 | B2 * | 6/2008 | Nokita | A61B 6/585 378/91 |
| 8,634,517 | B2 * | 1/2014 | Maack | A61B 6/542 378/154 |
| 8,903,048 | B2 * | 12/2014 | Kitano | A61B 6/542 378/115 |
| 8,971,494 | B2 * | 3/2015 | Tajima | A61B 6/4283 378/96 |
| 8,983,035 | B2 * | 3/2015 | Noma | A61B 6/548 378/114 |
| 9,042,519 | B2 * | 5/2015 | Kuwabara | A61B 6/4283 378/114 |
| 9,050,059 | B2 * | 6/2015 | Kuwabara | A61B 6/4283 |
| 9,060,731 | B2 * | 6/2015 | Kuwabara | A61B 6/4283 |
| 9,072,440 | B2 * | 7/2015 | Koishi | A61B 6/542 |
| 9,095,258 | B2 * | 8/2015 | Sakaguchi | A61B 6/503 |
| 9,201,149 | B2 * | 12/2015 | Ben Hayun | A61B 6/542 |
| 9,232,620 | B2 * | 1/2016 | Tajima | A61B 6/542 |
| 9,259,201 | B2 * | 2/2016 | Sato | A61B 6/542 |
| 9,265,467 | B2 * | 2/2016 | Kamiya | A61B 6/542 |
| 9,271,693 | B2 * | 3/2016 | Tajima | A61B 6/542 |
| 9,462,990 | B2 * | 10/2016 | Kuwabara | A61B 6/54 |
| 9,521,987 | B2 * | 12/2016 | Tajima | A61B 6/547 |
| 9,625,585 | B1 * | 4/2017 | Yokoyama | G01T 1/17 |
| 9,668,331 | B2 * | 5/2017 | Takahashi | H04N 25/67 |
| 9,675,307 | B2 * | 6/2017 | Ofuji | G01T 1/247 |
| 9,750,477 | B2 * | 9/2017 | Kitagawa | A61B 6/5241 |
| 9,820,714 | B2 * | 11/2017 | Sugahara | A61B 6/544 |
| 9,833,214 | B2 * | 12/2017 | Imamura | A61B 6/586 |
| 9,848,845 | B2 * | 12/2017 | Tajima | A61B 6/542 |
| 9,892,521 | B2 * | 2/2018 | Enomoto | A61B 6/589 |
| 9,931,092 | B2 * | 4/2018 | Tajima | A61B 6/488 |
| 10,074,679 | B2 * | 9/2018 | Tajima | H05G 1/44 |
| 10,245,003 | B2 * | 4/2019 | Hayashida | A61B 6/542 |
| 10,506,696 | B2 * | 12/2019 | Tamura | A61B 6/50 |
| 10,551,721 | B2 * | 2/2020 | Sato | G03B 7/08 |
| 10,881,370 | B2 * | 1/2021 | Kuwata | A61B 6/5205 |
| 10,992,883 | B2 * | 4/2021 | Kameshima | A61B 6/545 |
| 11,067,706 | B2 * | 7/2021 | Furumoto | A61B 6/488 |
| 11,071,514 | B2 * | 7/2021 | Mollov | A61B 6/482 |
| 11,083,430 | B2 * | 8/2021 | Sato | G01T 7/00 |
| 11,090,018 | B2 * | 8/2021 | Watanabe | A61B 6/54 |
| 11,166,693 | B2 * | 11/2021 | Saigusa | A61B 6/4208 |
| 11,294,078 | B2 * | 4/2022 | Miura | H04N 25/767 |
| 11,369,332 | B2 * | 6/2022 | Kunieda | A61B 6/542 |
| 11,382,590 | B2 * | 7/2022 | Niwa | A61B 6/542 |
| 11,399,796 | B2 * | 8/2022 | Umekawa | A61B 6/585 |
| 11,534,129 | B2 * | 12/2022 | Ohta | G01N 23/04 |
| 11,831,813 | B2 * | 11/2023 | Kawanabe | H04N 25/30 |
| 11,839,013 | B2 * | 12/2023 | Niwa | H05G 1/30 |
| 11,902,695 | B2 * | 2/2024 | Omi | A61B 6/00 |
| 12,150,804 | B2 * | 11/2024 | Kunieda | A61B 6/542 |
| 12,242,004 | B2 * | 3/2025 | Sasaki | A61B 6/548 |
| 12,295,779 | B2 * | 5/2025 | Taya | A61B 6/107 |

* cited by examiner

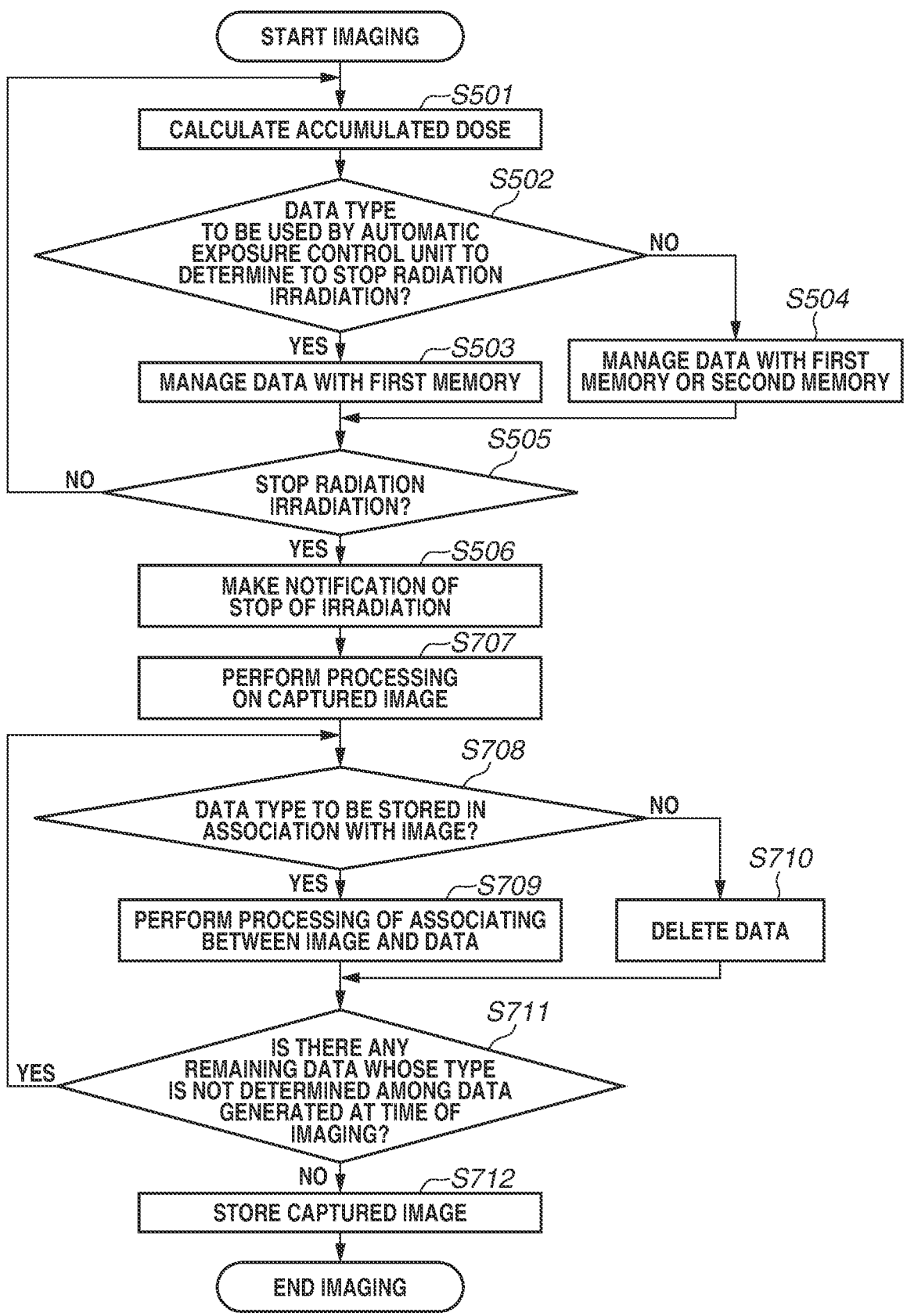

RADIATION IMAGING SYSTEM, RADIATION IMAGING APPARATUS COMPRISING DETECTION UNIT, AUTOMATIC EXPOSURE CONTROL UNIT, AND MEMORY CONTROL UNIT, AND CONTROL METHOD FOR RADIATION IMAGING APPARATUS

BACKGROUND

Field

The present disclosure relates to a radiation imaging apparatus, a radiation imaging system, and a control method for the radiation imaging apparatus.

Description of the Related Art

As a radiation imaging apparatus used for medical image diagnosis and non-destructive inspection using radiation such as X-rays, there is a radiation imaging apparatus including a flat panel detector (FPD) formed of a semiconductor material. For example, the radiation imaging apparatus in medical image diagnosis is used as a digital radiation imaging apparatus that performs still-image capturing such as general imaging and moving-image capturing such as fluoroscopic imaging.

In recent years, a study has been conducted to enhance the multifunctionality of radiation imaging apparatuses. One function of a multifunctional radiation imaging apparatus is to monitor a dose of irradiated radiation (accumulated dose) and stop radiation irradiation when the dose of irradiated radiation reaches a threshold (for example, outputting an irradiation stop signal for stopping radiation irradiation to a radiation generating apparatus). This function is called an automatic exposure control (AEC) function (hereinafter referred to as an AEC function). Examples of the AEC function include a method of monitoring a dose of radiation irradiated using part of pixels forming an image, and a method of monitoring a dose of irradiated radiation with another built-in sensor.

Japanese Patent Application Laid-Open No. 2014-241596 discusses a method for a radiation imaging apparatus having the AEC function to prevent a delay in control timing to stop radiation irradiation caused by an operation of accessing a memory.

In the AEC function, in a case where it takes some time after an accumulated dose reaches a threshold until the radiation imaging apparatus outputs a radiation irradiation stop signal to a radiation generating apparatus, there is an issue that timing for control to stop radiation irradiation is delayed and the accumulated dose exceeds the threshold.

In a case where the AEC function is implemented using one memory, the radiation imaging apparatus discussed in Japanese Patent Application Laid-Open No. 2014-241596 switches an operation method for accessing a memory of a pipeline signal processing circuit to prevent a delay in the control timing to stop radiation irradiation caused by an operation of accessing the memory.

The technology described in Japanese Patent Application Laid-Open No. 2014-241596 still has room for improvement in preventing a delay in the control timing to stop radiation irradiation.

SUMMARY OF THE INVENTION

The present disclosure is directed to a technique for preventing a delay in notification by an automatic exposure control unit of an instruction to stop radiation irradiation.

According to an aspect of the present disclosure, a radiation imaging apparatus includes a detection unit configured to detect radiation applied by a radiation generating apparatus, an automatic exposure control unit configured to determine whether to stop application of radiation based on an accumulated dose of the detected radiation and to notify the radiation generating apparatus of an instruction to stop the application of radiation in a case where it is determined to stop the application of radiation, a plurality of memories, and a memory control unit configured to store, in a first memory from among the plurality of memories, data to be used when the automatic exposure control unit makes the determination.

Further features will become apparent from the following description of exemplary embodiments with reference to the attached drawings.

BRIEF DESCRIPTION OF THE DRAWINGS

FIG. 6 is a flowchart illustrating a control method for the radiation imaging apparatus according to the second exemplary embodiment.

DESCRIPTION OF THE EMBODIMENTS

While exemplary embodiments will be described below with reference to drawings, details of configurations described in each of the exemplary embodiments are not limited to those described in the specification and the drawings. Note that radiation described in this specification includes, not only X-rays, but also α-rays, β-rays, γ-rays, particle rays, and cosmic rays.

System Configuration

Figure 1:
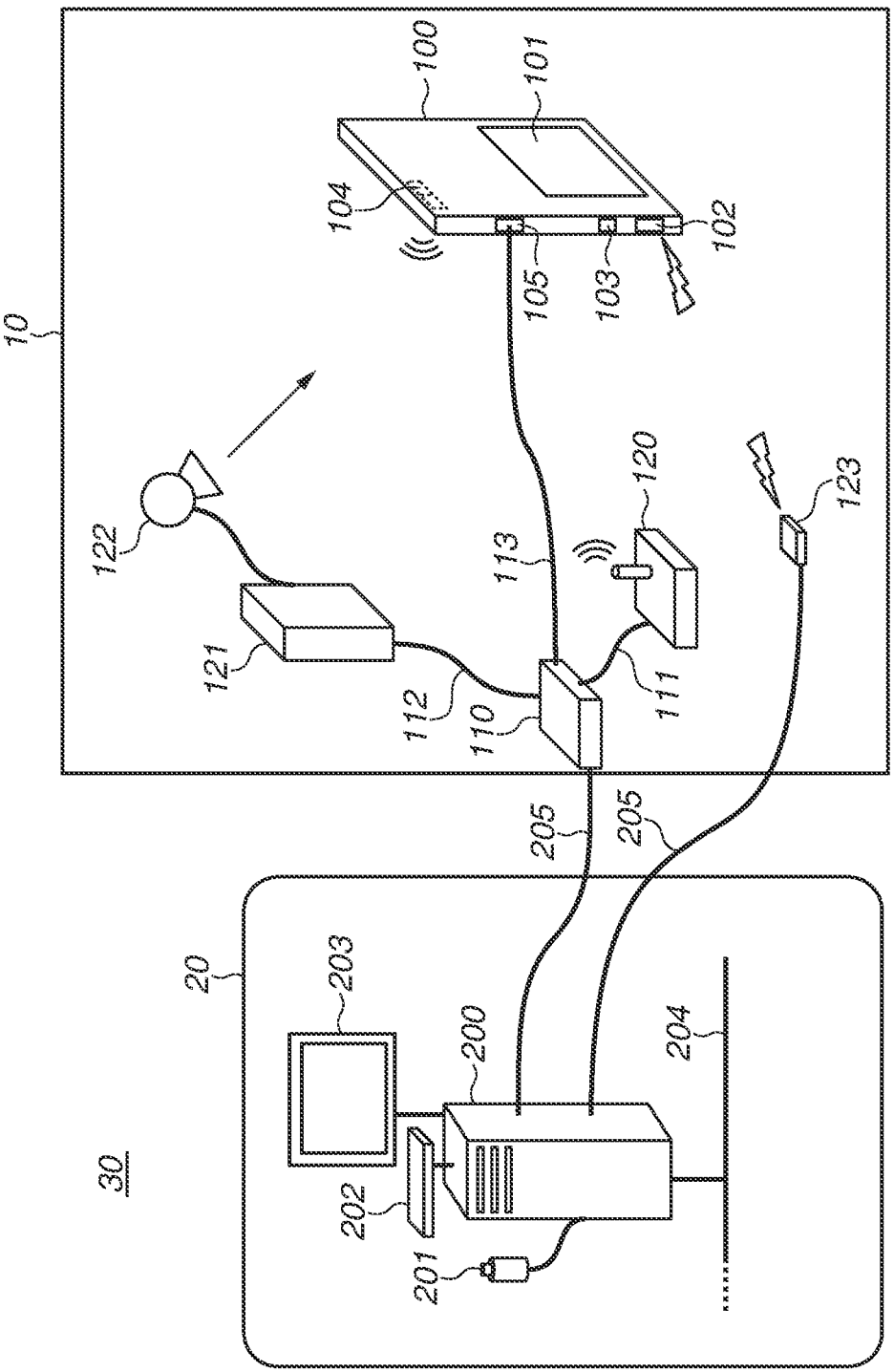
FIG. 1 is a diagram illustrating an example of a configuration of a radiation imaging system.

FIG. 1 is a diagram illustrating an example of a configuration of a radiation imaging system 30 according to a first exemplary embodiment. As illustrated in FIG. 1, the radiation imaging system 30 is installed in a radiation room 10 and a control room 20. In the radiation room 10, radiation imaging is performed by radiation irradiation. The control room 20 is located remote to the radiation room 10.

In the radiation room 10, the radiation imaging system 30 includes a radiation imaging apparatus 100, a communication control apparatus 110, an access point (AP) 120, a radiation generating apparatus 121, a radiation source 122, and an entry apparatus 123. In the radiation room 10, the radiation imaging system 30 also includes an AP communication cable 111, a radiation generating apparatus communication cable 112, and a sensor communication cable 113.

In the control room 20, the radiation imaging system 30 includes an information processing apparatus 200, a radiation irradiation switch 201, an input apparatus 202, a display apparatus 203, an in-hospital local area network (LAN) 204, and radiation room communication cables 205.

The radiation imaging apparatus 100 includes a power source control unit 101 including a battery and the like, a short-range wireless communication unit 102, a switch 103, a wireless communication unit 104, and a wired communication unit 105.

The radiation imaging apparatus 100 detects radiation that is irradiated by the radiation source 122 and penetrates through a subject A (not illustrated) and generates radiation image data.

The AP 120 is an access point for wireless communication, and is used for communication between the radiation imaging apparatus 100 and the radiation generating apparatus 121, and the information processing apparatus 200 via the communication control apparatus 110. The communication between the radiation imaging apparatus 100 and the communication control apparatus 110 can also be implemented as wired communication using the sensor communication cable 113. In the present exemplary embodiment, wireless communication using the AP 120 is used as an example.

The radiation generating apparatus 121 controls the radiation source 122 to irradiate the subject A with radiation (in a direction indicated by an arrow in FIG. 1). The radiation generating apparatus 121 includes a radiation source control unit and a generation control unit (both not illustrated). The radiation source control unit controls the radiation source 122 to perform radiation irradiation based on a predetermined condition. The generation control unit performs control to generate radiation using a signal indicating start or stop of irradiation that is transmitted from the radiation imaging apparatus 100. The radiation source control unit and the generation control unit can be independent apparatuses.

The AP communication cable 111 is a cable for connecting the AP 120 and the communication control apparatus 110. The radiation generating apparatus communication cable 112 is a cable for connecting the radiation generating apparatus 121 and the communication control apparatus 110.

The information processing apparatus 200 communicates with the radiation imaging apparatus 100 and the radiation generating apparatus 121 via the communication control apparatus 110, and performs overall control of the radiation imaging system 30. The radiation irradiation switch 201 is used by an operator B (not illustrated) to input timing of radiation irradiation. The input apparatus 202 is an apparatus the operator B uses to input an instruction, where various kinds of input devices such as a keyboard and/or a touch panel are used for the input apparatus 202.

The display apparatus 203 is an apparatus, for example a display, that displays radiation image data subjected to image processing and a graphical user interface (GUI). The in-hospital LAN 204 is an in-hospital backbone network. The radiation room communication cables 205 are cables for connecting the information processing apparatus 200 in the control room 20 and the communication control apparatus 110 in the radiation room 10 and for connecting the information processing apparatus 200 and the entry apparatus 123 in the radiation room 10.

An operation of the radiation imaging system 30 will now be described. First, the operator B performs an operation of registering the radiation imaging apparatus 100 with the radiation imaging system 30. When the switch 103 of the radiation imaging apparatus 100 is pressed by the operator B, short-range wireless communication is started between the short-range wireless communication unit 102 of the radiation imaging apparatus 100 and the entry apparatus 123.

The information processing apparatus 200 transmits wireless connection-related information of the AP 120 to the radiation imaging apparatus 100 via short-range wireless communication established between the short-range wireless communication unit 102 and the entry apparatus 123. In a case of using a wireless LAN, the wireless connection-related information includes, for example, a communication method such as Institute of Electrical and Electronics Engineers (IEEE) 802.11, a physical channel, a service set identifier (SSID), and an encryption key.

The radiation imaging apparatus 100 makes settings of the wireless communication unit 104 based on the received wireless connection-related information. With the settings, the radiation imaging apparatus 100 establishes connection for wireless communication with the AP 120.

The operator B then inputs, to the information processing apparatus 200, subject information such as identification (ID) of the subject A, a name of the subject A, a birth date of the subject A, and a part of the subject A to be imaged. After the part to be imaged is input, the operator B fixes the posture of the subject A and the radiation imaging apparatus 100.

When preparation for imaging is completed, the operator B presses the radiation irradiation switch 201. When the radiation irradiation switch 201 is pressed, the subject A is irradiated with radiation from the radiation source 122.

The radiation imaging apparatus 100 performs wireless communication with the radiation generating apparatus 121, and performs control to start and end the radiation irradiation. Radiation with which the subject A is irradiated penetrates through the subject A and is incident on the radiation imaging apparatus 100. The radiation imaging apparatus 100 converts incident radiation into visible light, and thereafter detects the visible light as a radiation image signal with a photoelectric conversion element (not illustrated).

The radiation imaging apparatus 100 drives the photoelectric conversion element to read out the radiation image signal, and causes an analog-to-digital (AD) conversion circuit to convert an analog signal to a digital signal, thereby obtaining radiation image data. The obtained radiation image data is transmitted from the radiation imaging apparatus 100 to the information processing apparatus 200 via wireless communication.

The information processing apparatus 200 performs image processing on the received radiation image data. The information processing apparatus 200 displays, on the display apparatus 203, a radiation image based on the radiation image data subjected to the image processing.

The information processing apparatus 200 functions as an image processing apparatus and a display control apparatus.

Hardware Configuration

Figure 2:
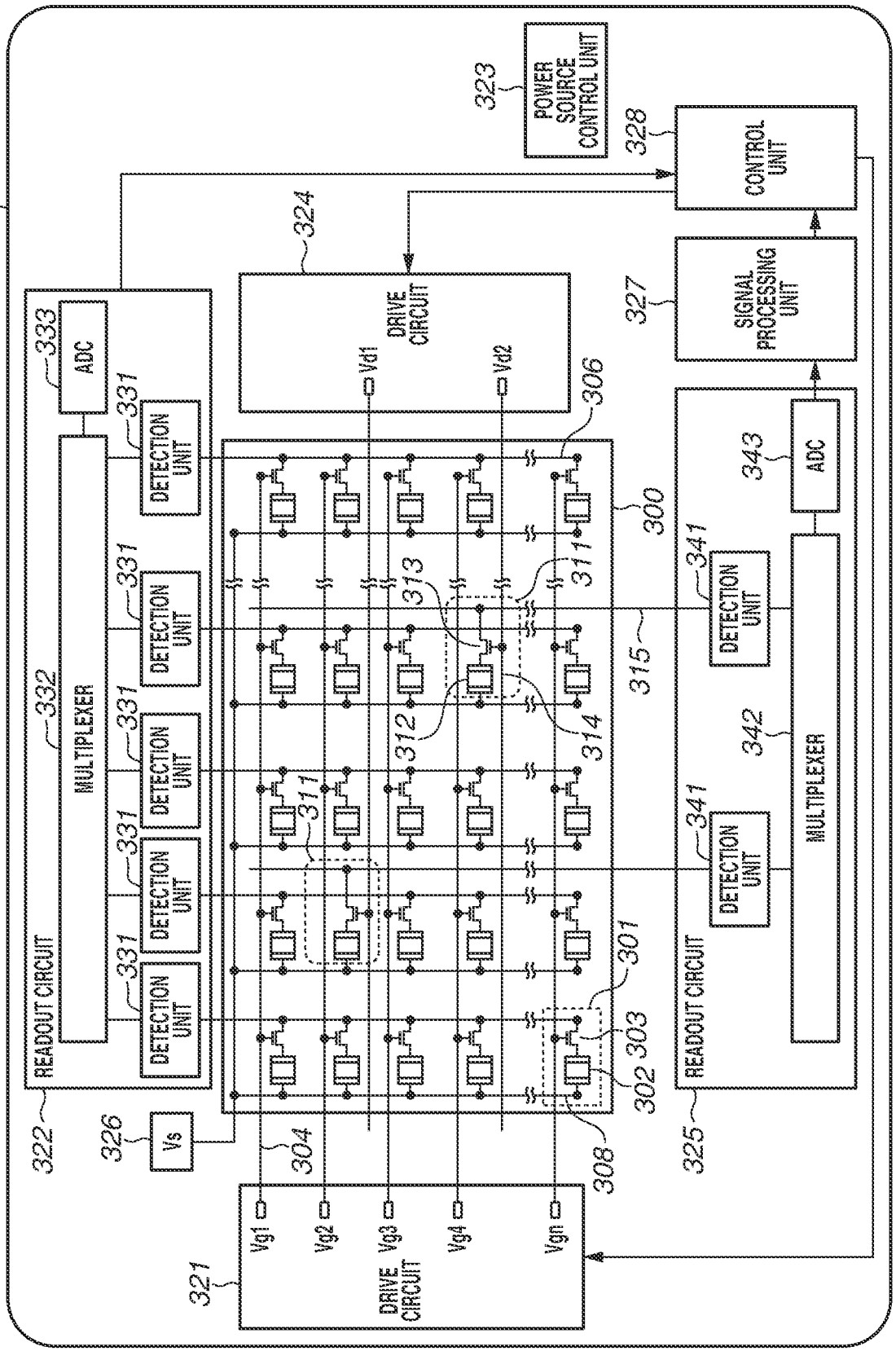
FIG. 2 is a diagram illustrating an example of a hardware configuration of a radiation imaging apparatus according to a first exemplary embodiment.

FIG. 2 is a diagram illustrating an example of a hardware configuration of the radiation imaging apparatus 100 illustrated in FIG. 1. As illustrated in FIG. 2, the radiation imaging apparatus 100 includes a radiation detector 300. The radiation detector 300 has a function of detecting irradiated radiation. The radiation detector 300 includes a plurality of pixels arrayed in a plurality of rows and a plurality of columns. In the following description, a region of the radiation detector 300 in which a plurality of pixels is arranged refers to an imaging region. The plurality of pixels includes a plurality of imaging pixels for acquisition of the radiation image data and a plurality of detection pixels 311 for monitoring of radiation irradiation.

Each imaging pixel 301 includes a first conversion element 302 that converts radiation into an electric signal, and a first switch 303 that is arranged between a column signal line 306 and the first conversion element 302. The detection pixel 311 includes a second conversion element 312 that converts radiation into an electric signal, and a second switch 313 that is arranged between a detection signal line 315 and the second conversion element 312. The detection pixel 311 is arranged in a column that is identical to that of some of the plurality of imaging pixels 301.

The first conversion element 302 and the second conversion element 312 each include a scintillator that converts radiation into light, and a photoelectric conversion element that converts light into an electric signal. The scintillator is generally formed to have a sheet-like shape and cover the imaging region, and is shared by the plurality of pixels. Alternatively, the first conversion element 302 and the second conversion element 312 each include a conversion element that directly converts radiation into an electric signal.

The first switch 303 and the second switch 313 each include, for example, a thin film transistor (TFT) of which an active region is formed by a semiconductor, such as amorphous silicon or polysilicon (desirably polysilicon).

The radiation imaging apparatus 100 includes a plurality of column signal lines 306 and a plurality of drive lines 304.

Each column signal line 306 corresponds to one of the plurality of columns in the imaging region. Each drive line 304 corresponds to one of the plurality of rows in the imaging region. Each drive line 304 is driven by a drive circuit 321.

The drive circuit 321 selectively causes voltages Vg1 to Vgn to be at a high level in a predetermined order, and turns ON the first switches 303 connected to the drive line 304 in one row. As a result, signals are output from the first conversion elements 302 in one row to the column signal lines 306 in the respective columns.

A first electrode of each first conversion element 302 is connected to a first main electrode of the corresponding first switch 303, and a second electrode of the first conversion element 302 is connected to a corresponding bias line 308. Each bias line 308 extends in a column direction, and is connected in common to second electrodes of the plurality of first conversion elements 302 arranged in the column direction.

Each bias line 308 receives a bias voltage Vs from a power source circuit for elements 326. The bias voltage Vs is supplied from the power source circuit for elements 326. A power source control unit 323 includes a battery, a direct current-direct current (DC-DC) converter, and the like. The power source control unit 323 generates a power source voltage for an analog circuit and a power source voltage for a digital circuit for performing drive control, wireless communication, and the like.

Second main electrodes of the first switches 303 of the plurality of imaging pixels 301 in one column are connected to one column signal line 306. Control electrodes of the first switches 303 of the plurality of imaging pixels 301 in one row are connected to one drive line 304. The plurality of column signal lines 306 is connected to a readout circuit 322. The readout circuit 322 includes a plurality of detection units 331, a multiplexer 332, and an analog-to-digital converter (hereinafter referred to as AD converter) 333.

Each of the plurality of column signal lines 306 is connected to corresponding one of the plurality of detection units 331 in the readout circuit 322. One column signal line 306 is connected to one detection unit 331. Each detection unit 331 includes, for example, a differential amplifier to amplify a signal from the corresponding column signal line 306. The multiplexer 332 selects the plurality of detection units 331 in a predetermined order, and supplies a signal from the selected detection unit 331 to the AD converter 333. The AD converter 333 converts the supplied signal into a digital signal, and outputs the digital signal to the control unit 328.

A first electrode of each second conversion element 312 is connected to a first main electrode of the corresponding second switch 313, and a second electrode of the second conversion element 312 is connected to the corresponding bias line 308. A second main electrode of each second switch 313 is connected to the corresponding detection signal line 315. A control electrode of each second switch 313 is electrically connected to a corresponding drive line 314.

The radiation imaging apparatus 100 includes a plurality of detection signal lines 315. One or more detection pixels 311 are connected to one detection line 315. The drive lines 314 are driven by a drive circuit 324. One or more detection pixels 311 are connected to one drive line 314. The detection signal lines 315 are connected to a readout circuit 325. The readout circuit 325 includes a plurality of detection units 341, a multiplexer 342, and an AD converter 343.

The drive circuit 324 causes voltages Vd1 and Vd2 to be at a high level, and turns ON the second switches 313 connected to the drive lines 314. As a result, signals from the second conversion elements 312 is output to the respective detection signal lines 315.

Each of the plurality of detection signal lines 315 is connected to a corresponding one of the plurality of detection units 341 in the readout circuit 325. One detection signal line 315 is connected to one detection unit 341. Each detection unit 341 includes, for example, a differential amplifier to amplify a signal from the corresponding detection signal line 315. The multiplexer 342 selects the plurality of detection units 341 in a predetermined order, and supplies a signal from the selected detection unit 341 to the AD converter 343. The AD converter 343 converts the supplied signal into a digital signal, and outputs the digital signal to a signal processing unit 327.

Output signals from the readout circuit 325 (AD converter 343) are supplied to the signal processing unit 327, and are processed by the signal processing unit 327. The signal processing unit 327 outputs information indicating radiation irradiation to the radiation imaging apparatus 100 based on the output signals from the readout circuit 325 (AD converter 343). Specifically, the signal processing unit 327, for example, detects radiation irradiation to the radiation imaging apparatus 100 and calculates a dose of irradiated radiation and/or an accumulated dose of irradiated radiation. Each detection pixel 311 can have a configuration that is identical to that of the imaging pixel 301.

The control unit 328 generates radiation image data based on the output signals from the readout circuit 322 (AD converter 333). The control unit 328 also controls the drive circuit 321, the drive circuit 324, the readout circuit 322, the readout circuit 325 based on information from the signal processing unit 327 and a control command from the information processing apparatus 200.

Figure 3:
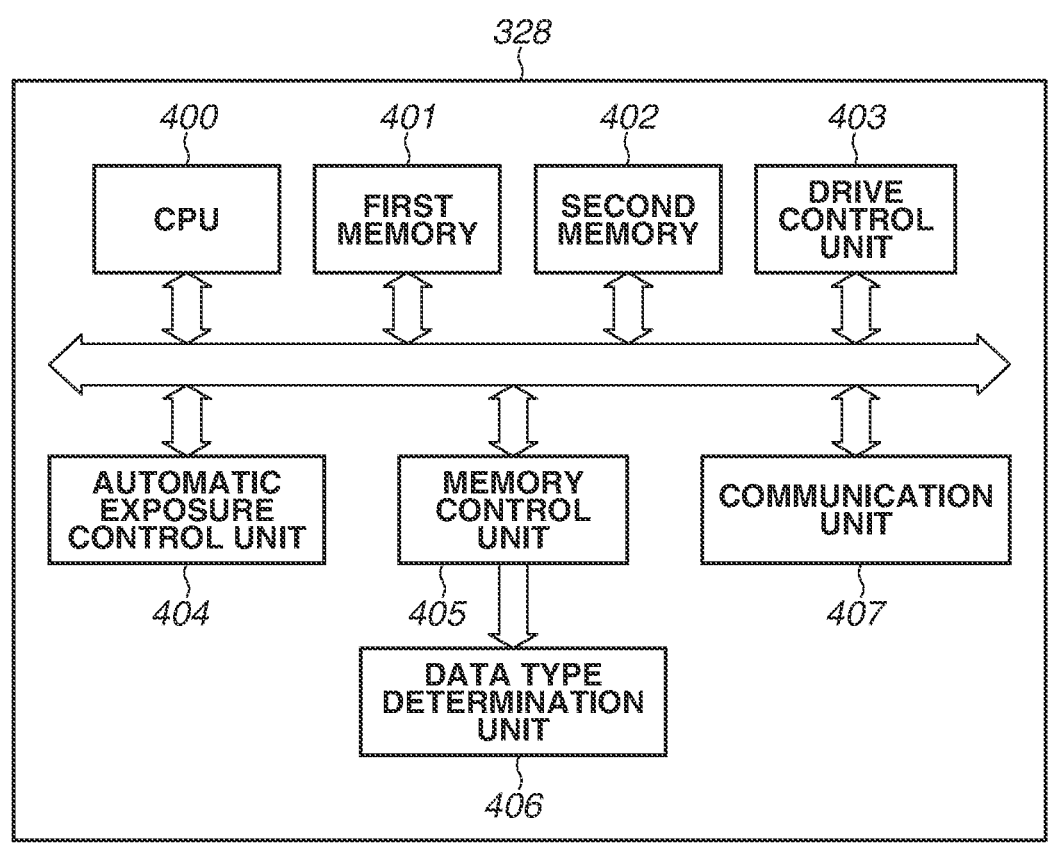
FIG. 3 is a diagram illustrating an example of a configuration of a control unit of the radiation imaging apparatus according to the first exemplary embodiment.

Processing of Managing Data Used for AEC
Function in First Memory and Performing Control
Operation to Control Dose of Radiation from
Radiation Generating Apparatus FIG. 3 is a diagram illustrating an example of a configuration of the control unit 328 of the radiation imaging apparatus 100 illustrated in FIG. 2. As illustrated in FIG. 3, the control unit 328 includes a central processing unit (CPU) 400, a first memory 401, a second memory 402, a drive control unit 403, an automatic exposure control unit 404, a memory control unit 405, a data type determination unit 406, and a communication unit 407.

The CPU 400 executes various kinds of programs stored in a storage medium serving as a program storage unit using the first memory 401 or the second memory 402 as a work memory to control the radiation imaging apparatus 100. The first memory 401 and the second memory 402 are memories that store various kinds of data handled in the CPU 400, and from/to which data is read/written. For example, the first memory 401 is a volatile memory that is closer to the CPU 400, and the second memory 402 is a volatile memory that is further from the CPU 400. Alternatively, for example, the first memory 401 can be a volatile memory and the second memory 402 can be a non-volatile memory. That is, the first memory 401 desirably has lower access latency than that of the second memory 402.

The access latency of a memory represents processing delay time at the time of writing/reading to/from the memory, and is determined by writing speed/reading speed of the memory itself, a distance between the CPU 400 and the memory, a distance between the automatic exposure control unit 404 and the memory, or the like. The memory having low access latency is a memory that is identical to a chip into which the CPU 400 that performs data processing of an automatic exposure control (hereinafter referred to as AEC function) function is built, and is a cache memory in the CPU 400, a non-volatile memory that is directly connected to a data processing unit from among a plurality of memories, or the like. In the present exemplary embodiment, an example in which two memories are mounted is described, but the number of memories is not limited thereto, and three or more memories can be mounted and distinguishably used.

The drive control unit 403 is controlled by the CPU 400, and controls the drive circuit 321, the drive circuit 324, the readout circuit 322, and the readout circuit 325, which are illustrated in FIG. 2, based on information from the signal processing unit 327 illustrated in FIG. 2 and a command from the information processing apparatus 200 illustrated in FIG. 1.

The automatic exposure control unit 404 is controlled by the CPU 400, and executes a dose control operation using the AEC function. The dose control operation using the AEC function will be described below with reference to a flowchart in FIG. 4.

The memory control unit 405 is controlled by the CPU 400, and determines types of various data subjected to processing by the radiation imaging apparatus 100 using the data type determination unit 406, and manages data with the first memory 401 or the second memory 402.

The communication unit 407 is controlled by the CPU 400, and communicates with the radiation generating apparatus 121 and the information processing apparatus 200 via the communication control apparatus 110, using the wireless communication unit 104 or the wired communication unit 105.

Figure 4:
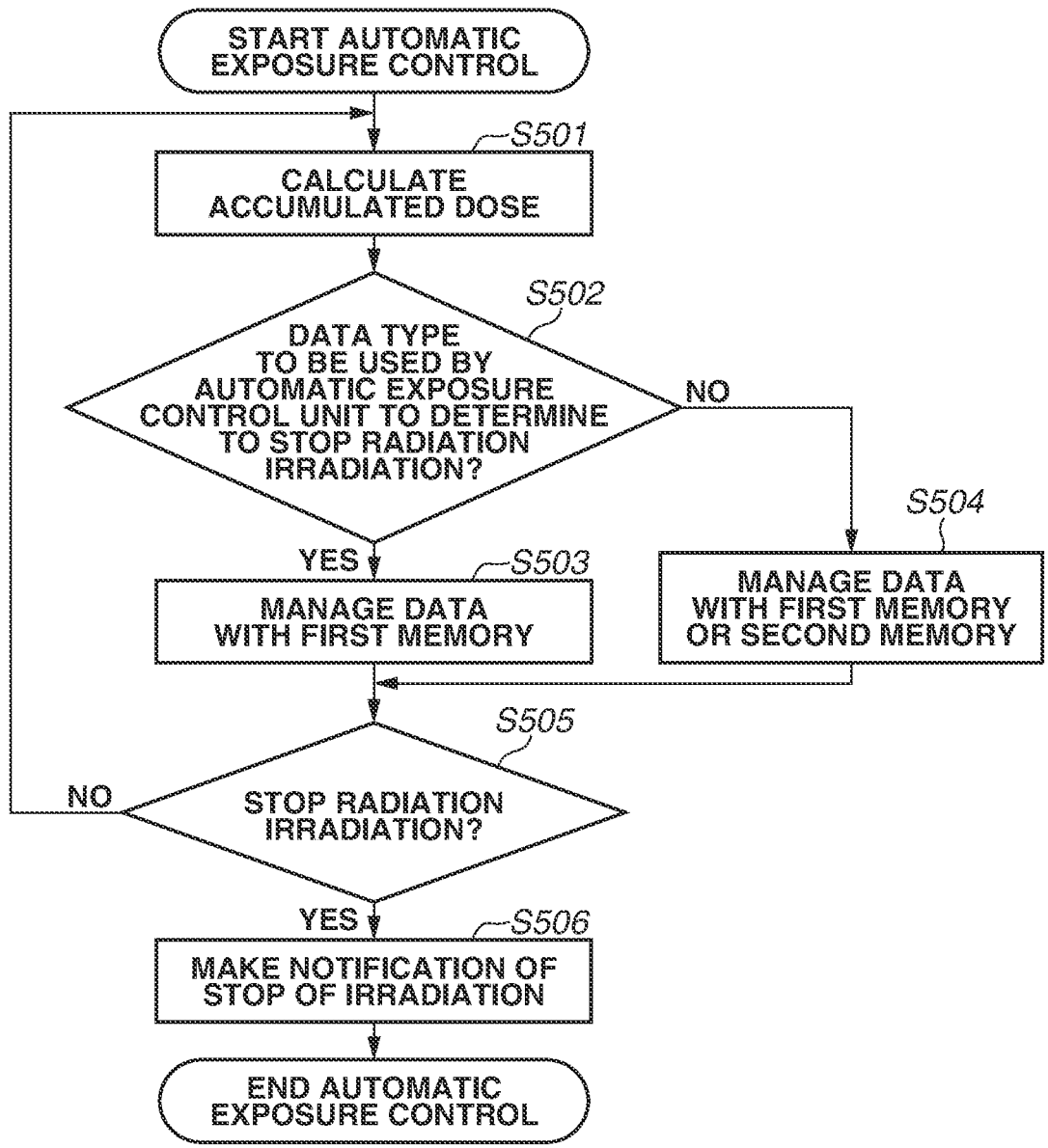
FIG. 4 is a flowchart illustrating a control method for the radiation imaging apparatus according to the first exemplary embodiment.

FIG. 4 is a flowchart illustrating a control method for the radiation imaging apparatus 100, and indicates the procedures for the dose control operation performed by the radiation imaging apparatus 100 using the automatic exposure control unit 404 and the memory control unit 405.

Before a description about FIG. 4 is provided, the procedures until the radiation imaging apparatus 100 is irradiated with radiation, which leads to start of automatic exposure control illustrated in FIG. 4, will be described. The operator B inputs, to the information processing apparatus 200, a dose, maximum irradiation time, a tube current, a tube voltage, information about a radiation detection region (a region of interest, hereinafter referred to as a ROI), which is a region in which radiation is to be monitored, part information, and the like. The information processing apparatus 200 transmits the input radiation irradiation conditions, the input information about the ROI, the input part information, and the like to the radiation imaging apparatus 100 and the radiation generating apparatus 121. When preparation for imaging is completed and the operator B presses the radiation irradiation switch 201, radiation is applied from the radiation source 122. The applied radiation penetrates through the subject A and is incident on the radiation imaging apparatus 100. When the radiation imaging apparatus 100 is irradiated with radiation, automatic exposure control is started in the procedures of the flowchart in FIG. 4.

In step S501, the automatic exposure control unit 404 detects radiation incident on the ROI with the detection pixel 311, and calculates an accumulated dose, which is an integrated value of detected doses of radiation. Data regarding the AEC function stored by the control unit 328 after calculation of the accumulated dose includes information about whether the AEC function is enabled/disabled, information about a ROI used for monitoring radiation in the AEC function, and a threshold of an accumulated dose used to determine to stop radiation irradiation in the AEC function. The data regarding the AEC function stored by the control unit 328 also includes a determination method of determining an accumulated dose used to determine to stop radiation irradiation in the AEC function. Examples of the determination method includes, in a case of using a plurality of ROIs, a logical AND determination method of determining that all accumulated doses of the ROIs to be used exceed the threshold, a logical OR determination method of determining that accumulated doses of one or more ROIs to be used exceed the threshold, and an averaging determination method of determining that an average value of accumulated doses of ROIs to be used exceeds the threshold. The data regarding the AEC function stored by the control unit 328 includes an accumulated dose of each ROI, an average value of accumulate doses of ROIs used in the AEC function, and the number of frames that have operated in the AEC function.

In step S502, the memory control unit 405 determines, using the data type determination unit 406, whether data processed in step S501 is data of a type to be used by the automatic exposure control unit 404 to determine to stop radiation irradiation. In a case where the data type determination unit 406 determines that the data is the data of the type to be used by the automatic exposure control unit 404 to determine to stop radiation irradiation (YES in step S502), the processing proceeds to step S503. In a case where the data type determination unit 406 determines that the data is not the data of the type to be used by the automatic exposure control unit 404 to determine to stop radiation irradiation (NO in step S502), the processing proceeds to step S504.

In step S503, the memory control unit 405 writes data in the first memory 401, and manages the data with the first memory 401. Examples of the data managed with the first memory 401 include the threshold of the accumulated dose used to determine to stop radiation irradiation in the AEC function, the determination method of determining the accumulated dose used to determine to stop radiation irradiation in the AEC function, the accumulated dose of each ROI, and the average value of accumulated doses of ROIs used in the AEC function. In addition, the memory control unit 405 collectively manages data with the first memory 401 if the data is the data to be used by the automatic exposure control unit 404 to determine to stop radiation irradiation, such as a correction value of the accumulated dose and data necessary for calculating the accumulated dose. Regarding data that is updated in step S501, like the accumulated dose of each ROI and the average value of accumulated doses of the ROIs used in the AEC function, the memory control unit 405 writes the updated data in the first memory 401 every time the data is updated. Regarding data whose content is not updated in step S501, like the threshold of the accumulated dose used to determine to stop radiation irradiation in the AEC function and the determination method of determining the accumulated dose used to determine to stop radiation irradiation in the AEC function, the memory control unit 405 writes the data in the first memory 401 only once. Thereafter, the processing proceeds to step S505.

In step S504, the memory control unit 405 writes the data in the first memory 401 or the second memory 402, and manages the data with the first memory 401 or the second memory 402. Examples of the data managed with the first memory 401 or the second memory 402 include whether the AEC function is abled/disabled, the information about the ROI used for monitoring radiation in the AEC function, and the number of frames that have operated in the AEC function. In addition, the memory control unit 405 manages data with either the first memory 401 or the second memory 402 if the data is data not to be used by the automatic exposure control unit 404 to determine to stop radiation irradiation. Thereafter, the processing proceeds to step S505.

In step S505, the automatic exposure control unit 404 refers to the data managed in the first memory (data stored in the first memory 401), and determines whether to stop radiation irradiation. In a case where the automatic exposure control unit 404 determines to stop radiation irradiation (YES in step S505), the processing proceeds to step S506. In a case where the automatic exposure control unit 404 determines not to stop radiation irradiation (NO in step S505), the processing returns to step S501, and the processing in step S501 and subsequent steps is repeated.

A determination method for the automatic exposure control unit 404 to determine whether to stop radiation irradiation in step S505 will now described. The automatic exposure control unit 404 calculates a proper dose from the part information, the imaging conditions, and the dose information that are input by the operator B. The automatic exposure control unit 404 then determines, as a timing to stop radiation irradiation, a threshold of the accumulated dose used to determine to stop radiation irradiation in the AEC function before starting an automatic exposure control operation, and manages the threshold of the accumulated dose in the first memory 401. The threshold of the accumulated dose is written in the first memory 401. When radiation irradiation is started, the automatic exposure control unit 404 determines whether the accumulated dose reaches the threshold based on the determination method of determining the accumulated dose used to determine to stop radiation irradiation in the AEC function that is managed in the first memory 401.

In a case where the determination method of determining the accumulated dose is the logical AND method, the automatic exposure control unit 404 compares the accumulated dose of each ROI managed in the first memory 401 to the threshold managed in the first memory 401. If each of accumulated doses of the ROIs to be used exceeds the threshold, the automatic exposure control unit 404 determines to stop radiation irradiation. In a case where the determination method of determining the accumulated dose is the logical OR method, the automatic exposure control unit 404 compares the accumulated dose of each ROI managed in the first memory 401 to the threshold managed in the first memory 401. If the accumulated doses of one or more ROIs to be used exceed the threshold, the automatic exposure control unit 404 determines to stop radiation irradiation. In a case where the determination method of determining the accumulated dose is the averaging method, the automatic exposure control unit 404 compares the average value of the accumulated doses of the ROIs used in the AEC function, which is managed in the first memory 401, and the threshold managed in the first memory 401. If the average value of the accumulated doses of the ROIs exceeds the threshold, the automatic exposure control unit 404 determines to stop radiation irradiation. In the present exemplary embodiment, the logical AND method, the logical OR method, and the averaging method have been described as the determination method of determining the accumulated dose, but the determination method is not limited thereto. Any determination method can be used as long as the method is based on the accumulated dose.

In step S506, the automatic exposure control unit 404 notifies the radiation generating apparatus 121 of an instruction to stop radiation irradiation using the communication unit 407. The radiation generating apparatus 121 stops radiation irradiation based on the notification of the instruction to stop radiation irradiation. While the radiation imaging apparatus 100 provides notification of the instruction to stop radiation irradiation as a detection result of detecting radiation, the configuration is not limited thereto. In another exemplary embodiment, the radiation imaging apparatus 100 can be configured to transmit an accumulated dose for each predetermined period as the detection result, and the radiation generating apparatus 121 can be configured to calculate an integrated value of the accumulated doses. The timing to stop radiation irradiation can be determined based on the maximum irradiation time input to the information processing apparatus 200 by the operator B.

As described above, the radiation imaging system 30 includes the radiation imaging apparatus 100 and the radiation generating apparatus 121 that performs radiation irradiation. The radiation detector 300 is a detection unit, includes a plurality of imaging pixels 301 and a plurality of detection pixels 311 arrayed in a plurality of rows and a plurality of columns to detect radiation, and detects radiation applied by the radiation generating apparatus 121. The control unit 328 includes a plurality of memories such as the first memory 401 and the second memory 402.

In step S505, the automatic exposure control unit 404 determines whether to stop radiation irradiation based on the accumulated dose of radiation detected by the radiation detector 300. In a case where the automatic exposure control unit 404 determines to stop radiation irradiation (YES in step S505), the processing proceeds to step S506. Specifically, in a case where the accumulated dose of radiation detected by the radiation detector 300 reaches the threshold, the automatic exposure control unit 404 determines to stop radiation irradiation.

In step S506, the automatic exposure control unit 404 notifies the radiation generating apparatus 121 of the instruction to stop radiation irradiation.

In step S503, the memory control unit 405 stores data to be used when the automatic exposure control unit 404 makes the above-mentioned determination in the first memory 401 from among the plurality of memories.

The data to be used when the automatic exposure control unit 404 makes the above-mentioned determination is the threshold of the accumulated dose, the determination method of determining the accumulated dose, the accumulated dose of each radiation detection region in which the dose of irradiated radiation is monitored, or the average value of the accumulated doses of the radiation detection regions in each of which the dose of irradiated radiation is monitored.

In step S504, the memory control unit 405 stores data not to be used when the automatic exposure control unit 404 makes the above-mentioned determination in the first memory 401 or the second memory 402 that is different from the first memory 401 from among the plurality of memories, or both the first memory 401 and the second memory 402. The memory control unit 405 can store data not to be used when the automatic exposure control unit 404 makes the above-mentioned determination from among the data regarding the AEC function, in the second memory 402 that is different from the first memory 401 from among the plurality of memories.

From among the data regarding the AEC function, an example of the data not to be used when the automatic exposure control unit 404 makes the above-mentioned determination will be described. The data includes data indicating whether the AEC function is enabled/disabled, the radiation detection region in which the dose of irradiated radiation is monitored, the radiation detection region in which radiation irradiation is determined to be stopped, and the number of frames driven in performing the automatic exposure control.

From among the plurality of memories including the second memory 402 and excluding the first memory 401, the first memory 401 has lower access latency than the other memories.

As described above, the radiation imaging apparatus 100 on which the plurality of memories is mounted collectively manages, using the memory control unit 405, in the first memory 401, data to be used by the automatic exposure control unit 404 to determine to stop radiation irradiation. The radiation imaging apparatus 100 stores the data to be used for determination regarding whether to stop radiation irradiation together in one memory to reduce the number of times of memory access and minimize a delay in processing for memory access. This enables the radiation imaging apparatus 100 to increase the processing speed and reduce the processing time required from when radiation irradiation is determined to be stopped in the automatic exposure control until when the instruction to stop radiation irradiation is provided to the radiation generating apparatus 121. The radiation imaging apparatus 100 uses a memory with low access latency from among the plurality of memories, and can thereby maximize effects of reducing the processing time required when radiation irradiation is determined to be stopped in the automatic exposure control until when the instruction to stop radiation irradiation is provided to the radiation generating apparatus 121. That is, the radiation imaging apparatus 100 can prevent a delay in timing for control to stop radiation irradiation that is caused by a memory access operation.

According to the technique discussed in Japanese Patent Application Laid-Open No. 2014-241596, in a radiation imaging apparatus on which a plurality of memories is mounted, data to be used for the AEC function is separately distributed to and stored in a plurality of memories, and thereby memory access occurs a plurality of times, which causes an issue that the accuracy in control to stop radiation irradiation can deteriorate. Furthermore, in a case where the data to be used for the AEC function is stored in a memory with high access latency, it takes longer time for the processing for memory access to determine whether the accumulated dose reaches the threshold, which causes a delay in timing for control to stop radiation irradiation.

According to the present exemplary embodiment, the radiation imaging apparatus 100 can perform control to stop radiation irradiation with the AEC function, thus preventing an accumulated dose of radiation from exceeding the threshold.

In a second exemplary embodiment, the radiation imaging apparatus 100 can, using the automatic exposure control unit 404 and the memory control unit 405, store captured radiation image data and data regarding the AEC function in association with each other and can delete unnecessary data.

In the following description of the second exemplary embodiment, the description of figures and components in the figures that are similar to those in the first exemplary embodiment is omitted.

System Configuration

A configuration of a radiation imaging system according to the present exemplary embodiment is similar to that illustrated in FIG. 1.

Hardware Configuration

A hardware configuration of a radiation imaging apparatus according to the present exemplary embodiment is similar to that illustrated in FIG. 2.

Figure 5:
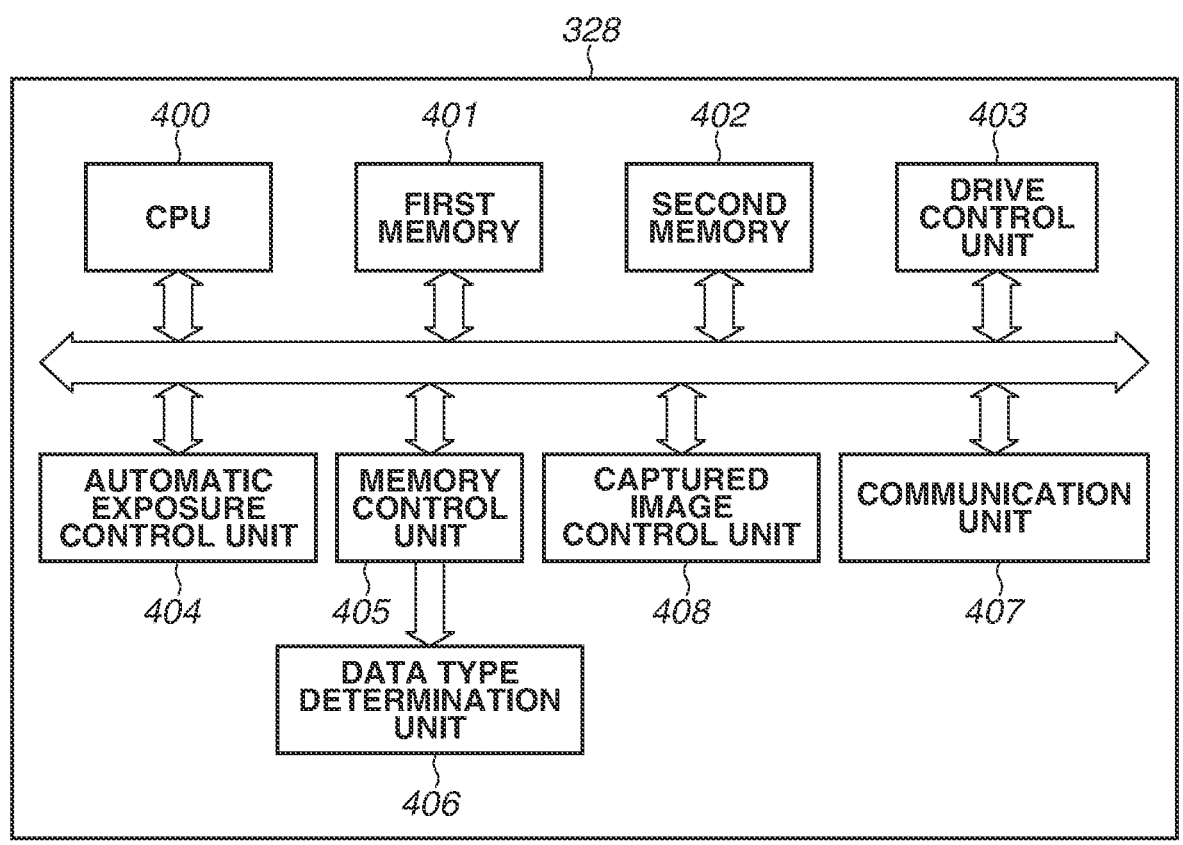
FIG. 5 is a diagram illustrating an example of a configuration of a control unit of a radiation imaging apparatus according to a second exemplary embodiment.

Processing of Storing Image Captured by Radiation Imaging Apparatus 100 and Data Regarding AEC Function in Associated Manner and Deleting Unnecessary Data FIG. 5 is a diagram illustrating an example of a configuration of a control unit 328 of a radiation imaging apparatus 100 according to the present exemplary embodiment. The control unit 328 illustrated in FIG. 5 is different from the control unit 328 illustrated in FIG. 3 in that a captured image control unit 408 is added in the configuration of the control unit 328 in FIG. 5.

The captured image control unit 408 is controlled by a CPU 400 and generates radiation image data. A memory control unit 405 stores the radiation image data generated by the captured image control unit 408 in a non-volatile memory (a first memory 401, a second memory 402, or a non-volatile memory that is not illustrated). A communication unit 407 transmits the radiation image data generated by the captured image control unit 408 to the information processing apparatus 200. The information processing apparatus 200 displays, on the display apparatus 203, a radiation image based on the received radiation image data.

FIG. 6 is a flowchart illustrating a control method for the radiation imaging apparatus 100 according to the present exemplary embodiment, and indicates procedures for the radiation imaging apparatus 100 to store data regarding the AEC function in association with the captured image and delete unnecessary data using the memory control unit 405.

The flowchart in FIG. 6 is different from the flowchart illustrated in FIG. 4 in that steps S707 to S712 are added in the flowchart in FIG. 6. Steps S501 to S505 in FIG. 6 are similar to steps S501 to S505 in FIG. 4, respectively, and as such, are not described herein. After step S506, the processing proceeds to step S707.

In step S707, the captured image control unit 408 generates radiation image data based on a digital signal read out from the readout circuit 322.

In step S708, the memory control unit 405 determines, using the data type determination unit 406, whether data regarding the AEC function generated at the time of imaging is data of a type to be stored in association with the radiation image data generated in step S707. In a case where the data type determination unit 406 determines that the data is the data of the type to be stored in association with the radiation image data (YES in step S708), the processing proceeds to step S709. In a case where the data type determination unit 406 determines that the data is not the data of the type to be stored in association with the radiation image data (NO in step S708), the processing proceeds to step S710.

In step S709, the memory control unit 405 associates the radiation image data generated by the captured image control unit 408 with the data regarding the AEC function generated at the time of imaging. A method of association can be a method of managing the data regarding the AEC function as header information of the radiation image data, or a method of managing the radiation image data using an identifier and managing the data regarding the AEC function for each identifier. The method is not limited thereto, and any method can be used as long as the radiation image data can be uniquely associated with the data regarding the AEC function generated at the time of imaging. Examples of the data regarding the AEC function to be associated with the radiation image data include information indicating whether the AEC function is abled/disabled, information about a ROI used for monitoring radiation in the AEC function, a determination method of determining an accumulated dose of radiation used in the AEC function, and information about a ROI used for determining to stop radiation irradiation in the AEC function. In addition, if there is any other data regarding the AEC function that is to be stored in association with the radiation image data, the memory control unit 405 associates the data with the radiation image data. The processing then proceeds to step S711.

In step S710, the memory control unit 405 deletes the data regarding the AEC function whose data type is determined in step S708 from the first memory 401 or the second memory 402 that manages the data. The processing then proceeds to step S711.

In step S711, the memory control unit 405 determines whether there is any remaining data whose data type is not determined in step S708 from among the data regarding the AEC function generated at the time of imaging. In a case where there is no remaining data whose data type is not determined in step S708 (NO in step S711), the processing proceeds to step S712. In a case where there is remaining data whose data type is not determined in step S708 (YES in step S711), the processing returns to step S708. In step S708, the radiation imaging apparatus 100 repeats the processing in step S708 and subsequent steps.

In step S712, the memory control unit 405 stores the radiation image data generated by the captured image control unit 408 and the data regarding the AEC function in association with each other in the non-volatile memory. A method of storing the radiation image data and the data regarding the AEC function in association with each other can be a method of managing the data regarding the AEC function as header information of the radiation image data or a method of managing the radiation image data using an identifier and managing the data regarding the AEC function for each identifier. The method is not limited thereto, and any method can be used as long as the radiation image data can be uniquely associated with the data regarding the AEC function generated at the time of imaging. With respect to the data regarding the AEC function that has been stored in the non-volatile memory, the memory control unit 405 can delete identical data remaining in a memory other than the storage destination.

As described above, in step S709, the memory control unit 405 associates the data regarding the AEC function with the radiation image data. Specifically, the memory control unit 405 associates data related to image data that is based on radiation detected by the radiation detector 300 from among the data regarding the AEC function with the image data that is based on radiation detected by the radiation detector 300.

In step S710, the memory control unit 405 deletes, from any of the plurality of memories, data that is not related to the image data that is based on radiation detected by the radiation detector 300 from among the data regarding the AEC function.

In step S712, the memory control unit 405 stores the image data that is based on radiation detected by the radiation detector 300 and the data regarding the AEC function associated with the image data in the non-volatile memory. The memory control unit 405 then deletes the data regarding the AEC function associated with the above-mentioned image data from any of the plurality of memories.

As described above, the radiation imaging apparatus 100 on which the plurality of memories is mounted, using the memory control unit 405 and the captured image control unit 408, stores the captured radiation image data and the data regarding the AEC function in association with each other and deletes unnecessary data. The radiation imaging apparatus 100 stores the captured radiation image data and the data regarding the AEC function in association with each other, so that the information processing apparatus 200 can refer to the data regarding the AEC function when receiving the radiation image data from the radiation imaging apparatus 100. The radiation imaging apparatus 100 deletes unnecessary data, thereby preventing waste of a memory region. That is, the radiation imaging apparatus 100 can reduce a possibility of a failure in storing data to be used to determine to stop radiation irradiation in one memory, and at the same time can prevent a delay in timing for control to stop radiation irradiation that is caused by a memory access operation.

Each of the above-described exemplary embodiments is merely a specific example for embodying the present disclosure, and the technical scope of the present disclosure is not interpreted in a limited manner by the exemplary embodiments. That is, the present disclosure can be implemented in various manners without departing from the technical idea or principal features of the present disclosure.

The present disclosure can prevent a delay in notification by an automatic exposure control unit of an instruction to stop radiation irradiation.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, these embodiments are not seen to be limiting. The scope of the following claims is to be accorded the broadest interpretation so as to encompass all such modifications and equivalent structures and functions.

This application claims the benefit of Japanese Patent Application No. 2022-069550, filed Apr. 20, 2022, which is hereby incorporated by reference herein in its entirety.

What is claimed is:

1. A radiation imaging apparatus comprising:
   a detection unit configured to detect radiation applied by a radiation generating apparatus;
   a plurality of memories storing programs; and
   at least one processor that executes the stored programs, which cause the at least one processor to:
      perform an automatic exposure control to determine whether to stop an application of radiation based on an accumulated dose of the detected radiation and to notify the radiation generating apparatus of an instruction to stop the application of radiation in a case where it is determined to stop the application of radiation; and
      store, in a first memory among the plurality of memories, data to be used when the at least one processor makes a determination whether to stop the application of radiation,
      wherein the first memory has a lower access latency than any other memory among the plurality of memories.

2. The radiation imaging apparatus according to claim 1, wherein the at least one processor further stores, in the first memory, in a second memory different from the first memory among the plurality of memories, or in both the first memory and the second memory, data not to be used when the at least one processor makes the determination whether to stop the application of radiation.

3. The radiation imaging apparatus according to claim 1, wherein, in a case where the accumulated dose of the detected radiation reaches a threshold, the at least one processor further determines to stop the application of radiation.

4. The radiation imaging apparatus according to claim 1, wherein the data to be used when the at least one processor makes the determination whether to stop the application of radiation is a threshold of the accumulated dose of the detected radiation, the accumulated dose in each radiation detection region, where an applied dose of radiation is monitored, or an average of accumulated doses in respective radiation detection regions, where respective applied doses of radiation are monitored.

5. The radiation imaging apparatus according to claim 1, wherein the at least one processor further stores, in a second memory that is different from the first memory among the plurality of memories, among data regarding an automatic exposure control function, data not to be used when the at least one processor makes the determination whether to stop the application of radiation.

6. The radiation imaging apparatus according to claim 5, wherein, among the data regarding the automatic exposure control function, the data not to be used when the at least one processor makes the determination whether to stop the application of radiation is information indicating whether the automatic exposure control function is enabled/disabled, a radiation detection region in which an applied dose of radiation is monitored, a radiation detection region in which the application of radiation is to be stopped, or a number of frames driven in the automatic exposure control function.

7. The radiation imaging apparatus according to claim 1, wherein the at least one processor associates data related to image data that is based on the detected radiation among data regarding an automatic exposure control function with the image data that is based on the detected radiation.

8. The radiation imaging apparatus according to claim 7, wherein the at least one processor deletes data not related to the image data that is based on the detected radiation among the data regarding the automatic exposure control function from any of the plurality of memories.

9. The radiation imaging apparatus according to claim 7, wherein after the at least one processor notifies the radiation generating apparatus of the instruction to stop the application of radiation, the at least one processor stores the image data that is based on the detected radiation and the data regarding the automatic exposure control function associated with the image data in a non-volatile memory among the plurality of memories.

10. The radiation imaging apparatus according to claim 9, wherein the at least one processor, after storing the image data that is based on the detected radiation and the data regarding the automatic exposure control function associated with the image data, deletes the data regarding the automatic exposure control function associated with the image data from any of the plurality of memories.

11. The radiation imaging apparatus according to claim 1, wherein the detection unit includes a plurality of pixels arrayed in a plurality of rows and a plurality of columns to detect radiation.

12. A radiation imaging apparatus comprising:
   a detection unit configured to detect radiation applied by a radiation generating apparatus;
   a plurality of memories storing programs; and
   at least one processor that executes the stored programs, which cause the at least one processor to:
      perform an automatic exposure control to determine whether to stop an application of radiation based on an accumulated dose of the detected radiation and to notify the radiation generating apparatus of an instruction to stop the application of radiation in a case where it is determined to stop the application of radiation; and store, in a first memory among the plurality of memories, data to be used when the at least one processor makes a determination whether to stop the application of radiation, wherein the at least one processor stores, in the first memory, in a second memory different from the first memory among the plurality of memories, or in both the first memory and the second memory, data not to be used when the at least one processor makes the determination whether to stop the application of radiation.

13. A radiation imaging apparatus comprising:

a detection unit configured to detect radiation applied by a radiation generating apparatus;

a plurality of memories storing programs; and at least one processor that executes the stored programs, which cause the at least one processor to:

perform an automatic exposure control to determine whether to stop an application of radiation based on an accumulated dose of the detected radiation and to notify the radiation generating apparatus of an instruction to stop the application of radiation in a case where it is determined to stop the application of radiation; and store, in a first memory among the plurality of memories, data to be used when the at least one processor makes a determination whether to stop the application of radiation, wherein the at least one processor stores, in a second memory that is different from the first memory among the plurality of memories, among data regarding an automatic exposure control function, data not to be used when the at least one processor makes the determination whether to stop the application of radiation.

14. A radiation imaging apparatus comprising:

a detection unit configured to detect radiation applied by a radiation generating apparatus;

a plurality of memories storing programs; and at least one processor that executes the stored programs, which cause the at least one processor to:

perform an automatic exposure control to determine whether to stop an application of radiation based on an accumulated dose of the detected radiation and to notify the radiation generating apparatus of an instruction to stop the application of radiation in a case where it is determined to stop the application of radiation; and store, in a first memory among the plurality of memories, data to be used when the at least one processor makes a determination whether to stop the application of radiation, wherein the at least one processor associates data related to image data that is based on the detected radiation among data regarding an automatic exposure control function with the image data that is based on the detected radiation.

15. A radiation imaging system comprising:

a radiation imaging apparatus; and an information processing apparatus configured to acquire radiation image data from the radiation imaging apparatus and process the radiation image data;

wherein the radiation imaging apparatus comprises:

a detection unit configured to detect radiation applied by a radiation generating apparatus;

a plurality of memories storing programs; and at least one processor that executes the stored programs, which cause the at least one processor to:

determine whether to stop an application of radiation based on an accumulated dose of the detected radiation and to notify the radiation generating apparatus of an instruction to stop the application of radiation in a case where it is determined to stop the application of radiation; and store, in a first memory among the plurality of memories, data to be used when the at least one processor makes a determination whether to stop the application of radiation, wherein the first memory has a lower access latency than any other memory among the plurality of memories.

16. A method for controlling a radiation imaging apparatus, the method comprising:

detecting radiation applied by a radiation generating apparatus;

performing an automatic exposure control to determine whether to stop an application of radiation based on an accumulated dose of the detected radiation and to notify the radiation generating apparatus of an instruction to stop the application of radiation in a case where the application of radiation is determined to be stopped; and storing, in a first memory having a lower access latency than any other memory among a plurality of memories, data to be used when a determination whether to stop the application of radiation is made.

* * * * *